US012094251B2

(12) United States Patent
Bar-Ilan et al.

(10) Patent No.: US 12,094,251 B2
(45) Date of Patent: Sep. 17, 2024

(54) METHOD AND APPARATUS FOR SWIMMER TRACKING

(71) Applicant: Lynxight Ltd., Yokneam Illit (IL)

(72) Inventors: Omer Bar-Ilan, Haifa (IL); Roee Mor, Haifa (IL)

(73) Assignee: Lynxight Ltd., Yokneam Illit (IL)

( * ) Notice: Subject to any disclaimer, the term of this patent is extended or adjusted under 35 U.S.C. 154(b) by 372 days.

(21) Appl. No.: 17/048,097

(22) PCT Filed: Apr. 14, 2019

(86) PCT No.: PCT/IL2019/050421
§ 371 (c)(1),
(2) Date: Oct. 16, 2020

(87) PCT Pub. No.: WO2019/202587
PCT Pub. Date: Oct. 24, 2019

(65) Prior Publication Data
US 2021/0174073 A1   Jun. 10, 2021

Related U.S. Application Data

(60) Provisional application No. 62/658,157, filed on Apr. 16, 2018.

(51) Int. Cl.
*G06V 40/20* (2022.01)
*G06T 7/246* (2017.01)
(Continued)

(52) U.S. Cl.
CPC .............. *G06V 40/23* (2022.01); *G06T 7/246* (2017.01); *G06V 20/52* (2022.01); *G06V 40/10* (2022.01);
(Continued)

(58) Field of Classification Search
CPC ........ G06V 40/23; G06V 20/52; G06V 40/10; G06T 7/246; G06T 2207/30196; G06T 2207/30221
See application file for complete search history.

(56) References Cited

U.S. PATENT DOCUMENTS

| 4,969,036 A | * | 11/1990 | Bhanu | G05D 1/0253 |
| | | | | 348/113 |
| 11,216,654 B2 | * | 1/2022 | Golan | G06T 7/73 |
| 2009/0303055 A1 | * | 12/2009 | Anderson | G08B 21/086 |
| | | | | 340/573.6 |
| 2017/0178524 A1 | * | 6/2017 | Firmin | A63B 71/0619 |
| 2017/0357884 A1 | * | 12/2017 | Friedman | G06K 19/06075 |

(Continued)

FOREIGN PATENT DOCUMENTS

| CN | 101650870 | 2/2010 |
| CN | 103413114 | 11/2013 |

(Continued)

OTHER PUBLICATIONS

Eng et al., "An automatic drowning detection surveillance system for challenging outdoor pool environments", Proceedings of the Ninth IEEE International Conference on Computer Vision (Year: 2003).*

(Continued)

*Primary Examiner* — Kenny A Cese

(57) ABSTRACT

A method, system and computer program product, the method comprising: obtaining a first multiplicity of images from an overhead capture device overlooking a body of water; detecting a swimmer in some of the images, wherein the swimmer is outside the body of water or separated from other swimmers; determining two descriptors of the person, based on the images, the first descriptor related to a portion of the swimmer outside the water, the second related to a portion inside the water, the descriptors determined upon (Continued)

visual characteristics extracted from the images; obtaining a second multiplicity of images from the device; and tracking the swimmer in the second multiplicity of images, said tracking comprises detecting the swimmer using either descriptor, said detecting the swimmer is performed with respect to an image from the second multiplicity of images in which the swimmer is partially occluded by other swimmers or adjacent to other swimmers.

18 Claims, 3 Drawing Sheets

(51) Int. Cl.
*G06V 20/52* (2022.01)
*G06V 40/10* (2022.01)

(52) U.S. Cl.
CPC ............... *G06T 2207/30196* (2013.01); *G06T 2207/30221* (2013.01)

(56) References Cited

U.S. PATENT DOCUMENTS

| 2018/0040223 | A1* | 2/2018 | Bodi | G08B 21/18 |
| 2018/0089980 | A1* | 3/2018 | Snyder | G06T 7/254 |
| 2019/0034712 | A1* | 1/2019 | Golan | G06V 10/764 |

FOREIGN PATENT DOCUMENTS

| CN | 106022230 | 10/2016 |
| DE | 10063524 | 6/2002 |

OTHER PUBLICATIONS

ISR for PCT/IL2019/050421 (Jul. 31, 2019).
Extended European Search Report for Application 19788560.1 issued Nov. 23, 2021 (7 pages).
Eng et al., "An automatic drowning detection surveillance system for challenging outdoor pool environments", ICCV, Oct. 13, 2003, pp. 532-539 (8 pages).

* cited by examiner

METHOD AND APPARATUS FOR SWIMMER TRACKING

CROSS REFERENCE TO RELATED APPLICATIONS

The present invention is a non-provisional utility patent application that is based upon and claims benefit of priority filing date of U.S. provisional patent application Ser. No. 62/658,157 filed Apr. 16, 2018 for "SWIMMER TRACKING", which is incorporated herein by reference in its entirety.

TECHNICAL FIELD

The present disclosure relates to monitoring bodies of water such as swimming pools in general, and to a method and apparatus for tracking swimmers in the bodies of water, in particular.

BACKGROUND

Drowning accidents in swimming pools, ponds, lakes or other closed bodies of water are a disaster not only to the victim and his or her family, but to a larger circle of people, including friends, colleagues, other swimmers or bathers and their families, and in particular the owners or operators of the pool, life guards, or other people who are held responsible for the accident. Such people, in addition to their own feelings of guilt and remorse, often face harsh financial consequences.

However, guarding against such accidents, and in particular during crowded hours or in crowded areas of the pool, is not an easy task. It is often impossible to view the full area of the pool at once and pay attention to many occurrences. Thus situations can develop quickly into disastrous results at one area while the guard is looking at another area. Additionally, it is hard for a person such as the life guard to focus over long periods of time, without losing the attention and concentration even for a short period.

Thus, monitoring swimming pools in general, and identifying dangerous situations in particular, is a critical and challenging task.

BRIEF SUMMARY

Will be Completed Based on the Claims

One exemplary embodiment of the disclosed subject matter is a computer-implemented method comprising: obtaining a first multiplicity of images taken by one or more overhead capture devices overlooking a body of water having a surface; detecting a swimmer in at least some images from the first multiplicity of images, wherein the swimmer is outside the body of water or separated from other swimmers in at least some of the first multiplicity of images; determining a first descriptor and a second descriptor of the person, based on the at least some images from the first multiplicity of images, wherein the first descriptor is related to a portion the swimmer that is outside the body of water, wherein the second descriptor is related to a portion of the swimmer that is inside the body of water, the first descriptor and the second descriptor are determined based on visual characteristics extracted from the at least some images; obtaining a second multiplicity of images taken by the at least one overhead capture device; and tracking the swimmer in the second multiplicity of images, wherein said tracking comprises detecting the swimmer using at least one of the first descriptor and the second descriptor, wherein said detecting the swimmer is performed with respect to at least one image in which the swimmer is at least one image from the second multiplicity of images in which the swimmer is at least partially occluded by other swimmers or adjacent to other swimmers. Within the method, the second descriptor is optionally determined based on the first descriptor. Within the method, the second descriptor is optionally determined based on the first descriptor and predetermined modifications. The method can further comprise: determining whether the swimmer is above or below the water in at least some of the second multiplicity of images; and subject to determining that the swimmer is below the water in at least some of the second multiplicity of images, taking an action. Within the method, the action is optionally selected from the group consisting of: setting off an alarm; sounding an alarm; generating a visual or vibrating alert; and notifying a life guard or the like. The method can further comprise: analyzing presence of the swimmer in the pool and its environment; and reporting the statistics to an operator. The method can further comprise: analyzing presence of the swimmer in the pool and its environment; and taking an action related to the presence. Within the method, tracking the person is optionally performed also in an image in which a first part of the person is separated from a second part of the person by a part of another person. Within the method, one device of the at least one overhead capture device optionally has a viewing angle of at most 70° between a first line connecting the device and a projection of the device on a plane containing the surface, and a second line connecting the device and point on the surface farthest from the device. Within the method, one or more of the overhead capture devices optionally captures an entire surface the body of water. Within the method, said detecting optionally comprises differentiating a background and foreground of the image. Within the method, the first descriptor or the second descriptor are optionally updated based on the at least one visual attribute as extracted from images in the second multiplicity of images. Within the method, the first descriptor or the second descriptor are optionally selected from the group consisting of: a color histogram; an edge; an edge histogram; a gradient histogram; a contour edge between colors; a contour edge between shapes; a distinct feature; a unique pattern; a comer; an edge; a color co-occurrence matrix, and a texture.

Another exemplary embodiment of the disclosed subject matter is a system having a processor, the processor being adapted to perform the steps of: obtaining a first multiplicity of images taken by one or more overhead capture devices overlooking a body of water having a surface; detecting a swimmer in at least some images from the first multiplicity of images, wherein the swimmer is outside the body of water or separated from other swimmers in at least some of the first multiplicity of images; determining a first descriptor and a second descriptor of the person, based on the at least some images from the first multiplicity of images, wherein the first descriptor is related to a portion the swimmer that is outside the body of water, wherein the second descriptor is related to a portion of the swimmer that is inside the body of water, the first descriptor and the second descriptor are determined based on visual characteristics extracted from the at least some images; obtaining a second multiplicity of images taken by the at least one overhead capture device; and tracking the swimmer in the second multiplicity of images, wherein said tracking comprises detecting the swimmer using at least one of the first descriptor and the second descriptor, wherein said detecting the swimmer is performed with respect to at least one image in which the swimmer is at least one image from the second multiplicity of images in which the swimmer is at least partially occluded by other swimmers or adjacent to other swimmers Yet another exemplary embodiment of the disclosed subject matter is a computer program product comprising a non-transitory computer readable medium retaining program instructions, which instructions when read by a processor, cause the processor to perform: obtaining a first multiplicity of images taken by one or more overhead capture devices overlooking a body of water having a surface; detecting a swimmer in at least some images from the first multiplicity of images, wherein the swimmer is outside the body of water or separated from other swimmers in at least some of the first multiplicity of images; determining a first descriptor and a second descriptor of the person, based on the at least some images from the first multiplicity of images, wherein the first descriptor is related to a portion the swimmer that is outside the body of water, wherein the second descriptor is related to a portion of the swimmer that is inside the body of water, the first descriptor and the second descriptor are determined based on visual characteristics extracted from the at least some images; obtaining a second multiplicity of images taken by the at least one overhead capture device; and tracking the swimmer in the second multiplicity of images, wherein said tracking comprises detecting the swimmer using at least one of the first descriptor and the second descriptor, wherein said detecting the swimmer is performed with respect to at least one image in which the swimmer is at least one image from the second multiplicity of images in which the swimmer is at least partially occluded by other swimmers or adjacent to other swimmers

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
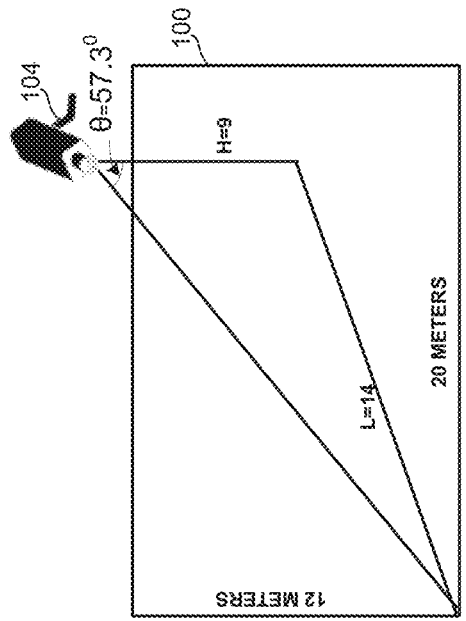
FIGS. 1A, 1B, 1C and 1D show exemplary configurations for monitoring a pool with overhead cameras, in accordance with some exemplary embodiments of the disclosed subject matter.

The term "pool" or "swimming pool" used in this specification should be expansively construed to cover any kind of a body of water in which people can bathe or swim, including, for example, also a pond, a lake, or the like.

The term "camera" or "video camera" used in this specification should be expansively construed to cover any kind of capture device, capturing still images or video streams.

The term "swimmer" used in this specification should be expansively construed to cover any person at a pool or at the pool area, whether the person is inside the water or not, whether the person is swimming or not, or even knows how to swim, or the like.

Monitoring pools is a critical and challenging task. Even if a life guard is present at a pool, people may drown in a very short time, such that if the life guard is looking the other way, precious time may be lost until the situation is detected, at which stage it may already be too late.

Thus, one technical problem is the need to identify hazardous situations in a pool, for example a person being under the water surface for over a predetermined period of time.

Another technical problem is the need to track swimmers in images capturing a pool, such that each swimmer can be monitored. Tracking may refer to identifying an image region, e.g., a blob or a pixel group containing each swimmer visible in each frame of the scene.

In images captured by a camera, even if the camera is overlooking the scene, groups of swimmers that swim proximately to each other, above or below one another, or touch each other, may partially or fully occlude each other as seen from the camera point of view, and appear as large connected blobs, with no gaps of water between swimmers.

Moreover, when swimmers are in close proximity, a swimmer's body may appear split or separated into several parts as it is partially occluded by one or more other swimmers or body parts thereof. Thus, tracking in such crowded scenarios is harder than in non-crowded situations in which the swimmers are separated. Therefore, in order to track swimmers correctly, the swimmers first need to be separated from each other in images in which they are captured.

Yet another technical problem is the need to track the swimmers in images having water background, Water background is complex, dynamic and ever-changing, due to multiple effects such as but not limited to ripples, waves, splashing, reflections of natural and artificial light, and even more complex effects such as illumination from underwater light sources, which may change due to waves and provide different reflections of the same location in the surface of the pool at different times. Thus, since in order to track an object it needs to be separated from its background and its boundaries need to be realized, tracking a swimmer in an image having water background is harder than with a static background such as a street, a home, an office, a shopping-mall, or the like.

Moreover, in a pool setting, different body parts of the swimmers may frequently go in and out of the water, which significantly changes their appearance and the overall appearance of the swimmer. Thus, there is no "nominal" appearance for each swimmer or for a body part of the swimmer. Even from a fixed viewpoint, the appearance may be altered as the body part changes its depth in the water. Additionally or alternatively, the body of a swimmer in the water may change its posture often, thus forming a highly non-rigid and variable object, with significant deformation, including shape, size, color and texture. All these factors make known similarity analysis methods irrelevant.

Yet another technical problem is to detect hazardous situations using a system which is easy and inexpensive to install and maintain.

Drowning usually begins with 30-60 seconds of active struggle. If not rescued, a drowning person can become submerged and motionless, either due to loss of consciousness or shock. After 1-3 minutes in this phase, permanent brain damage may occur. Therefore, it is vital to detect such situations and rescue the person within about 1 minute. Naive methods that aim to detect drowning or other critical situations may suffer from significant drawbacks, some of which are discussed below.

Some methods may employ overhead cameras that capture the pool area, and detect swimming movements, which are typical of a drowning person. Such movements include movement of the torso and the limbs. However, such detection is hard to implement and as a result may have many misses, or cause many false alarms, to a degree that the method may become useless and impractical.

Other methods may employ underwater cameras, and attempt to detect motionless people in the part of the frame matching the volume below the water surface. The installation and maintenance of such cameras are complex and expensive, inter alia, since multiple cameras may be required, for example 8-12 cameras may be used for covering a 12 m×25 m pool. In addition, coordinating between multiple cameras adds to the complexity of the solution.

Further methods may use sonar systems, which map the pool volume and detect motionless and submerged swimmers. Such systems are also complex and expensive to install and maintain.

Yet further methods may use wearable devices worn by swimmers, which combine motion and depth sensors that detect when the swimmer is underwater and motionless. Such devices are cumbersome, and many people are reluctant to use them on a regular basis.

One technical solution of the disclosure comprises one or more overhead cameras that, individually or in combination, capture the entire surface of the pool optionally with sonic margins, and optionally significant part of the pool floor or ground. Images taken by the camera may be analyzed to track a person before entering the pool, in the pool wherein some or all of the swimmer's body is submerged in the water, and after exiting the pool. In order to track a person, it may be required to separate the swimmer from the background and from other swimmers. The swimmer may be detected in one or more images when the swimmer is separated from other swimmers and before entering the water, and a descriptor of the swimmer may be calculated and used for identifying and tracking the swimmer in further images.

The descriptor calculation and tracking may be performed upon one or more visual characteristics of each image, such as a color histogram, an edge or gradient histogram, contours edges between colors and shapes on the swimmer or between the swimmer and the background, distinct features and unique patterns, corners, edges, a color co-occurrence matrix, texture, and the like.

Another technical solution of the disclosure relates to identifying the swimmer both inside and outside the water. This may be performed, for example by using the descriptor and changes caused to the descriptor by the swimmer being partly or fully inside the water, which changes the visual appearance. The descriptor may thus be configured to hold information describing the swimmer inside and outside the water, thereby enabling to track swimmers while diving.

The descriptor can be used for separating the swimmer from adjacent swimmers. In some exemplary embodiments, the descriptor may be utilized to segment an image showing multiple adjacent swimmers, whereby separating close swimmers, even in highly crowded scenarios.

Yet another technical solution of the disclosure relates to tracking the swimmers for providing better monitoring of the pool. In some embodiments, the count of people in the pool and its environment may be tracked, such that if a person is missing but has not been tracked exiting the pool, an alert may be raised. In some embodiments, if a specific swimmer is not tracked for a predetermined period of time, or if the swimmer is tracked under the water for at least a predetermined period of time, an alert may be raised. In some embodiments, since swimmers usually have limited number of swimming suits, swimmers may be identified from previous visits to the pool, such that visit statistics may be determined and used, for example by a pool owner or operator.

In some embodiments, it may not be required that the person is tracked in all images. In such embodiments, a swimmer may not be identified, or may be identified with a. probability below a threshold in some images. However, if the number of consecutive images in which the swimmer is not identified is below a threshold, tracking may continue without raising an alert.

Yet another technical solution of the disclosed subject matter relates to the installation of one or more overhead cameras. The cameras may be installed to provide an overhead look of the entire water surface of the pool. Additionally or alternatively, the cameras may be installed so as to provide, for each location at the pool's water surface, at least one view in which the viewing angle is above a predetermined angle. Such a requirement may provide an overhead view that is useful for computer vision techniques, and may specifically provide for easier separation between swimmers than cameras capturing swimmers from the side. Additionally or alternatively, the cameras may be installed so as to provide coverage of a substantial portion of the bottom of the pool, such as of at least about 80% of surface of the bottom, about 90%, or the like.

One technical effect of the disclosure relates to tracking swimmers in a pool, whether each swimmer is separated from other swimmers, touching or is partly or fully occluded by other swimmers. The swimmer may be tracked with static background or with water background, thus providing for tracking the swimmer both inside and outside the pool.

Yet another technical effect of the disclosure relates to detecting and tracking the swimmer using their visual appearance as captured in images, taken by the overhead camera. This provides for easy installation, operation and maintenance of a corresponding system.

In the current disclosure, the overhead camera may comprise one or more cameras located higher than the surface of the water at the monitored pool, and fully capturing, individually or in combination, the surface of the pool. The height of the camera above the surface may be denoted as H, and the distance between a vertical projection of the camera on the plane of the water surface, and point P on the surface which is farthest from the projection of the camera is denoted by L. Thus, L/H is $\tan(\theta)$ wherein $\theta$ denotes the angle to the farthest point P.

As the value of $\theta$ are smaller, images may be clearer and there may be less occlusions and distortions in images of the pool being captured, for example occlusions created by swimmers other than a swimmer being monitored. Thus, smaller angles are generally preferable. It will be appreciated that as the camera is positioned higher or closer to the geometric center of the pool, the value of H increases, or the value of L decreases, respectively, which decreases the size of θ.

In some exemplary embodiments, the value of θ may not exceed a threshold of about 60°, about 65°, about 70°, or the like. In some exemplary embodiments, for each location within the pool, at least one camera has an angle θ below the threshold with respect to the location. It will be appreciated that in case of angular view into the depth of the pool, the water may create distortions which may be augmented.

In some exemplary embodiments, the camera. may be positioned in a height above the height of a life guard's eyes. For example, if a typical life guard has the height of about 1.80 meters, his eyes may be located at a height of about 1.65 meters. The camera may be positioned above such height. In some cases, the life guard may be using a tower or an elevated chair, allowing him to sit at height of about 3 meters. The camera may be positioned above such height.

In some exemplary embodiments, placing the camera above the pool or close to an edge of the pool may provide a few advantages: the camera can capture volume down to the bottom of the pool; occlusions by other swimmers or by people walking by the pool are reduced; "blind zones" created by the pool walls are avoided or reduced; and the distance the light travels within the water is minimized, thus providing for higher clarity and less distorted images.

These advantages contribute to the accuracy of analyzing the captured images and extracting visual characteristics therefrom.

FIG. 1A shows an exemplary embodiment, in which the camera is positioned above the pool geometric center at a height of 6 m above the pool. Assuming a rectangular pool having dimensions of 20 m×12 m, θ is of about 62.9°.

Figure 1B:
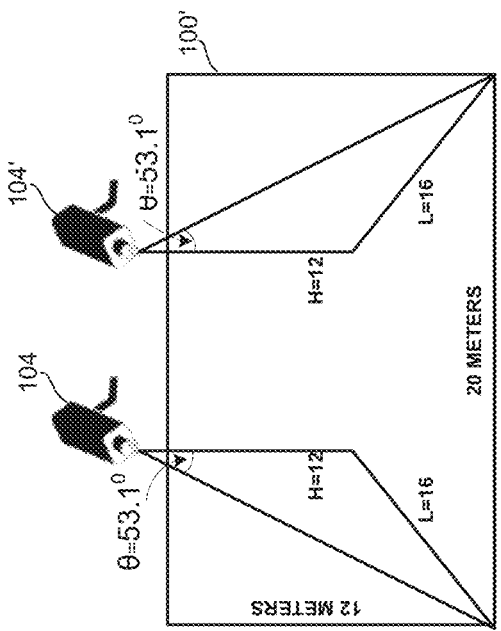

FIG. 1B shows a different configuration in which the camera is located at height of 9 meters, above the pool but not above the geometric center of the pool. As shown in FIG. 1B, for the same pool, locating the camera such that L=14 m provides for θ of about 57.3°.

Figure 1C:
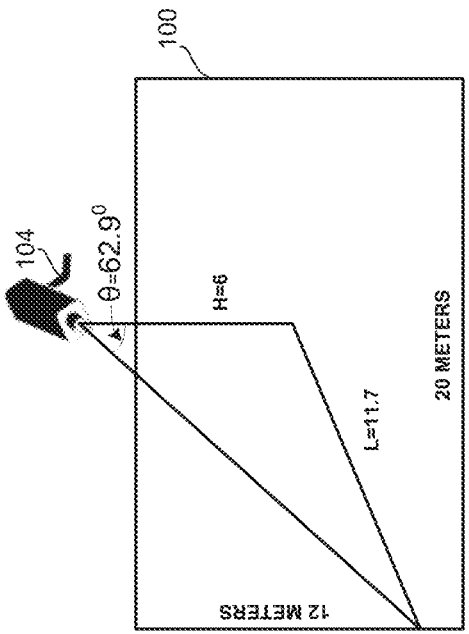

FIG. 1C shows a further configuration, in which the camera is positioned at a height of 15 m above the water surface plane, such that the projection of the camera on the water surface plane is external to the pool. In this exemplary case, L=27.1 m, which provides for θ of about 61°.

Figure 1D:
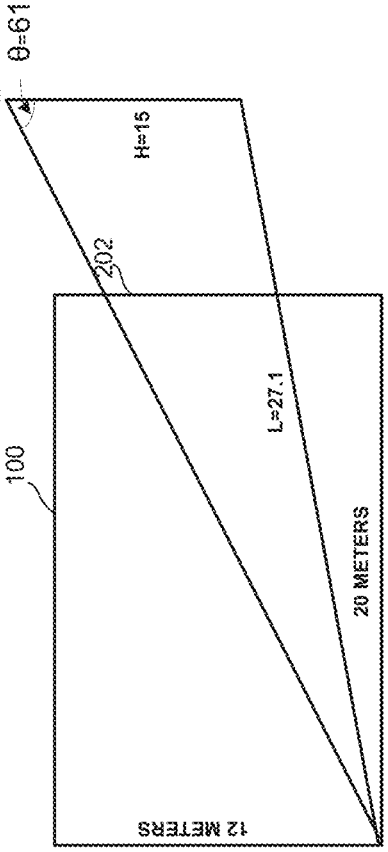

FIG. 1D shows a further configuration, in which two cameras are used for covering the full pool area of a larger pool, having dimensions of 20 m×50 m. In this configuration, the cameras are located at a height of 12 m, and such that L=16 m, thus providing for θ of about 53.1°. It will be appreciated that in this configuration, L is the maximal distance to a point that is not closer to another camera.

In further embodiments, two cameras may be used and located at either side of the pool, for example externally to the short sides of the pool.

Figure 2:
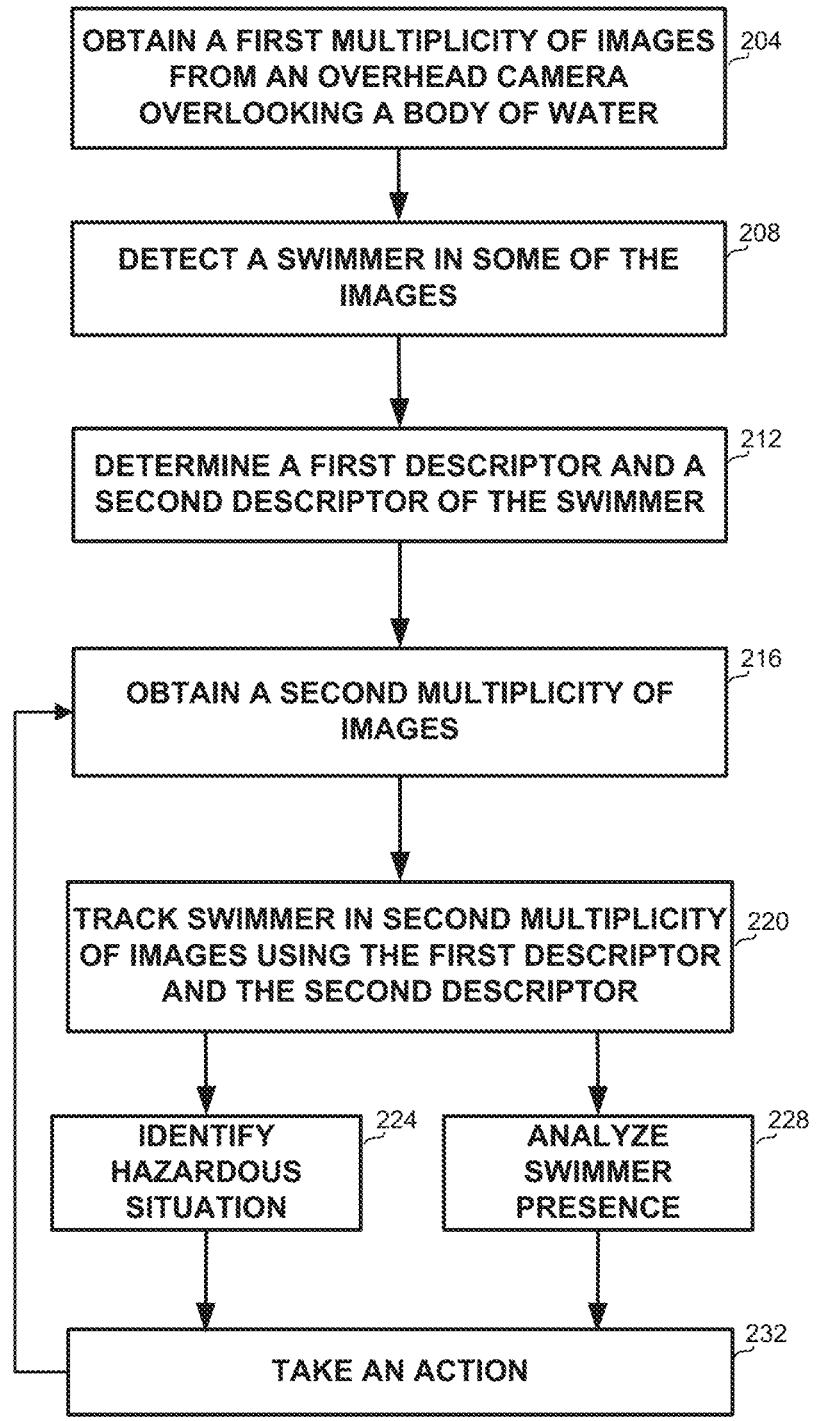
FIG. 2 shows a flowchart of steps in a method for tracking swimmers, and taking an action if required, in accordance with some exemplary embodiments of the disclosed subject matter.

Referring now to FIG. 2, showing a flowchart of steps in a method for tracking a swimmer in images captured in a pool.

On Step 204, one or more images captured by one or more cameras overlooking a pool may be obtained, as described in association with FIGS. 1A-1D above. Each image may be obtained in any format and via any channel, for example Local Area Network, Wi-Fi, cellular, or any other wired or wireless manner. In some embodiments, images may be obtained as a video stream.

On Step 208, a swimmer may be detected in one or more images, wherein the swimmer is outside the water in at least some of the images. In further embodiments, the swimmer may be separate from all other swimmers, for example some background may be present in any image between the swimmer and any other swimmer. It will be appreciated that although the disclosure relates to detecting and analyzing one swimmer, multiple swimmers may be detected in any of the images, and the analysis may continue as described below in respect to each detected swimmer. The swimmer may be detected utilizing any background/foreground detection technique, such as but not limited to temporal averaging, Gaussian Mixture Model (GMM), also referred to as mixture of Gaussians (MOG) background estimation, Robust Principle Component Analysis (RPCA), subspace learning, and background subtraction.

Once the swimmers are separated from the background, the swimmers may be detected in the image, using techniques such as but not limited to Machine Learning (ML) algorithms, for example You Only Look Once (YOLO), Regional Convolutional Neural Networks (R-CNN), Fast R-CNN, Faster R-CNN, or the like. Detection may relate to determining an area, a surrounding line, ellipse, polygon or another shape surrounding the area, or a group of pixels describing a swimmer within an image.

In some embodiments, the swimmer may be separated from any other person. The separation and detection may be verified, for example, by checking whether the person's proportions are within a predetermined range of human proportions as captured by the respective camera.

On Step 212, descriptors of each swimmer may be calculated to uniquely identify the swimmer. A first descriptor may be calculated for at least a portion of the swimmer being outside the pool, and a second descriptor may be calculated for at least a portion of the swimmer being inside the pool. The second descriptor may be based on the first descriptor, for example applying predetermined modifications on the first descriptor to obtain the second descriptor. The modifications may be due to swimmer being in water environment detailed in Table 1 below.

For both descriptors, the swimmer may be separate from other swimmers. Each descriptor may comprise or be based on a set of visual attributes obtained from one or more images of the swimmer, or parts of captured images in which the swimmer is depicted alone, optionally with surrounding water. Thus, each analyzed image may be a rectangle or another closed line or polygon extracted from a captured image.

The images may be taken from different angles or poses inside and outside the water, due to the swimmers movement in and around the pool. Additionally or alternatively, a plurality of cameras may provide images of the same swimmer from different angles. The descriptors may be continuously updated during the tracking process whenever a clear image of the swimmer can be obtained.

The visual attributes may include but are not limited to calculating one or more numbers or other identifiers based any one or more of the following attributes, and optionally combining the identifiers: a color histogram, a gradient histogram, contour edges between colors and shapes on the swimmer, body dimensions, distinct features of the swimmer, unique patterns, corners and edges, a color co-occurrence matrix, and texture. In some exemplary embodiments, a descriptor may be generated based on clustering of various feature vectors representing the swimmer.

In some exemplary embodiments, a color histogram may comprise a probability distribution over the range of possible values for each color, for one or more color channels (e.g. RGB, HSV, LAB). The colors histogram may be indicative of the colors which represent a specific swimmer. Such colors may be affected, for example, from the color of the swimmer's skin, the color of the bathing suit, the length of the hair, the color of the hair, or the like.

In some exemplary embodiments, a descriptor may be based on a color co-occurrence matrix generated while the swimmer is well separated from other swimmers.

In some exemplary embodiments, a descriptor may be generated based on a spatial color distribution referencing the body-part location, i.e. color patterns specific to the head, upper body, lower body, limbs, or the like.

In some exemplary embodiments, a gradient histogram may comprise a statistical description of the gradients in different directions within an area of the swimmer's image. In some exemplary embodiments, the difference between adjacent horizontal pixels may be the gradient in the horizontal direction. A statistical description can be the average of the all the gradients, the standard deviation of the all the gradients, the $90^{th}$ percentile, or the like. In some exemplary embodiments, an internal gradient histogram may be provided to describe the gradients inside the swimmer's image. Additionally or alternatively, an external gradient histogram may be provided depicting the gradient on the border between the portion of the image representing the swimmer and the pool.

In some exemplary embodiments, contour edges between colors and shapes on the swimmer may be used. The contour edges may be provided in terms of shape and length. For example, a contour detection algorithm may be employed, and the top N (e.g., 5) longest contours may be obtained therefrom. From the N longest contours any one or more of the following attributes may be extracted: length, curvature, distance from the center of the swimmer, or the like. Similar to the gradient histogram, such information may be obtained from inside the swimmer's image (internal contours and on the borders between the swimmer and the pool (external contours).

In some exemplary embodiments, distinct features and unique patterns, corners and edges may be extracted and used as features or identifiers, such as a pattern on a swim cap, swimsuit straps appearance on swimmer's back, borders between swimsuit and body, tattoos, or the like. Such features may be identified in the swimmer's image and utilized to facilitate tracking thereof.

In some exemplary embodiments, body dimensions and proportions of a swimmer may be utilized as visual attributes. The body dimensions and proportions may include but are not limited to any one or more of the following: height, head size, limb sizes, waist size, proportions between body parts e.g head proportion relative to full body or torso length, limb proportion relative to full body or torso length, waist proportion relative to full body or torso length, limb to waist proportions), or the like. Size can be measured from a calibrated and registered camera, or by comparing to nearby objects having a known size.

Additionally or alternatively, a texture of each swimmer may be utilized, represented using co-occurrence distribution. The first descriptor and the second descriptor may be different since the swimmer visual appearance changes when above or below water, thus the first descriptor may relate to the appearance of a swimmer outside the water, and the second descriptor may relate to the appearance of a swimmer inside the water. It will be appreciated that the first descriptor and/or the second descriptor may relate to one or more descriptors.

In some embodiments, computer vision descriptors (e.g. Scale-Invariant Feature Transform (SIFT), Speeded Up Robust Features (SURF), or Features from Accelerated Segment Test (FAST)) may be used to describe and represent various parts of swimmers either above or below the water surface.

Table 1 below summarizes some differences between the appearance of visual descriptors for objects, including swimmers, above or below the water surface.

TABLE 1

| Visual descriptor | Above water | Under water |
| --- | --- | --- |
| Colors | Vivid, deep, high contrast | Dull, grayish, small contrast, more similar to background |
| Edges | Sharp, well defined | Blurred, indistinct |
| Contours | Continuous, round shapes | Breaking into several parts, |
| Distinct features | Well defined, clear borders | Fuzzy, blurred |
| Texture | Homogenous, patterns exist | Heterogeneous, appearing random |

A classification of above/below water may be performed with respect to each swimmer or body part thereof. This classification allows the system to determine the swimmer's state and update or use the correct descriptors. Classification may be performed using ML algorithms such as k nearest neighbors (kNN), support vector machines (SVM), or classification trees, and exploiting supervised learning techniques such as but not limited to data augmentation, regularization, outlier rejection, reinforcement learning or others.

On Step 216, a second multiplicity of images may be obtained, in which it may be required to track one or more swimmers. The images may be obtained similarly to obtaining the first images as described in association with step 204 above.

On Step 220, the swimmer may be tracked in an image of the second multiplicity of images, relatively to a preceding image, meaning that the swimmer appearing in a first mage is associated with and assumed to be the same swimmer appearing in a second image, thus providing for tracking the swimmer over a multiplicity of images.

In order to track a swimmer, the swimmer needs to be separated from adjacent or occluding swimmers. Adjacent swimmers relate to other swimmers which may appear in one or more images as having a part of their contour lines overlapping or crossing the contour lines of the swimmer. It will be appreciated that although the swimmers may appear adjacent in an image under a certain resolution, a finer resolution may show some distance between the swimmers.

The swimmer may be separated from adjacent swimmers based on the descriptors of each swimmer. As disclosed above, in some exemplary embodiments, a swimmer's descriptor may be generated based on clustering of feature vectors representing the swimmer. In some cases, the centroid of a cluster may be utilized to represent the swimmer, and a maximal distance from the centroid may be used to define a threshold for detecting the same swimmer, wherein the distance calculation may use the same metrics as used for clustering. For example, if the threshold is defined as 200% of the maximal distance, then if a feature vector having a distance of 120% the maximal distance is extracted from a swimmer's image, the image may be attributed to the same swimmer. If the feature vector has a distance of 250% of the maximal distance, then it may be determined that this is not the same swimmer. In some cases, the identification of the swimmers may be performed by iteratively determining for each swimmer a distance to all centroids of swimmers that have not yet been identified in the image. In some exemplary embodiments, in case several feature vectors can be associated with the same centroid, a selection may be made therebetween, for example based on minimal distance, minimal aggregated distance, maximal number of overall associations, or the like. After all the swimmers that can be identified based on their distance and threshold are identified, all remaining feature vectors and centroids may be examined to determine a mapping therebetween. In some exemplary embodiments, the mapping may be performed by a greedy algorithm that finds a minimal distance and iteratively maps based thereon. Additionally or alternatively, the mapping may be performed so as to provide an optimized solution of minimal total distance between feature vectors and centroids.

Tracking can use, for example, edge detection techniques for determining edges between face and hair, edges or contours created by the swimming suit, identifying direction and speed and estimating the location of a swimmer in a following image, or the like. The edges or other characteristics may be calculated for the swimmer or for the image as a whole, or for parts of the swimmer or parts of the image. It will be appreciated that a swimmer may be tracked in images capturing the swimmer before entering into the water, for example on the pool side, and then continue tracking the swimmer within the water, based on the descriptor and changes expected due to the swimmer being in or out of the water.

Additionally or alternatively, correlation between pixel and groups of pixels (e.g., patches) between adjacent frames, may be utilized in order to track a swimmer. As an example, if in an $n^{th}$ frame each swimmer is associated with a set of pixels, correlation may be utilized to search for this set in the $(N+1)^{th}$ frame. Additionally or alternatively, the disclosed subject matter may employ optical flow algorithms or displacement estimation algorithms which can detect complex geometric transforms (e.g. rotation or scaling) such as PatchMatch or NeedleMatch, stereo-vision correspondence algorithms, or the like. The results of the correlation in terms of correlation value and/or location may be included in the segmentation decision upon which tracking is based.

On Step 224, it may be determined whether a hazardous situation has been determined. Exemplary hazardous situations may include but are not limited to a swimmer that has been identified under the water for at least a predetermined number of consecutive images, a swimmer last seen inside the pool that has not been tracked for a predetermined number of images, or the like.

Subject to a situation being identified, an action may be taken, on step 232 such as setting off an alarm; sounding an alarm; generating a visual or vibrating alert; and notifying a life guard or the like.

On step 228, the swimmer's presence in the pool and its environment may be analyzed, for example statistics may be calculated related to the swimmer's presence in or out of the water, length of stay, or the like.

Figure 3:
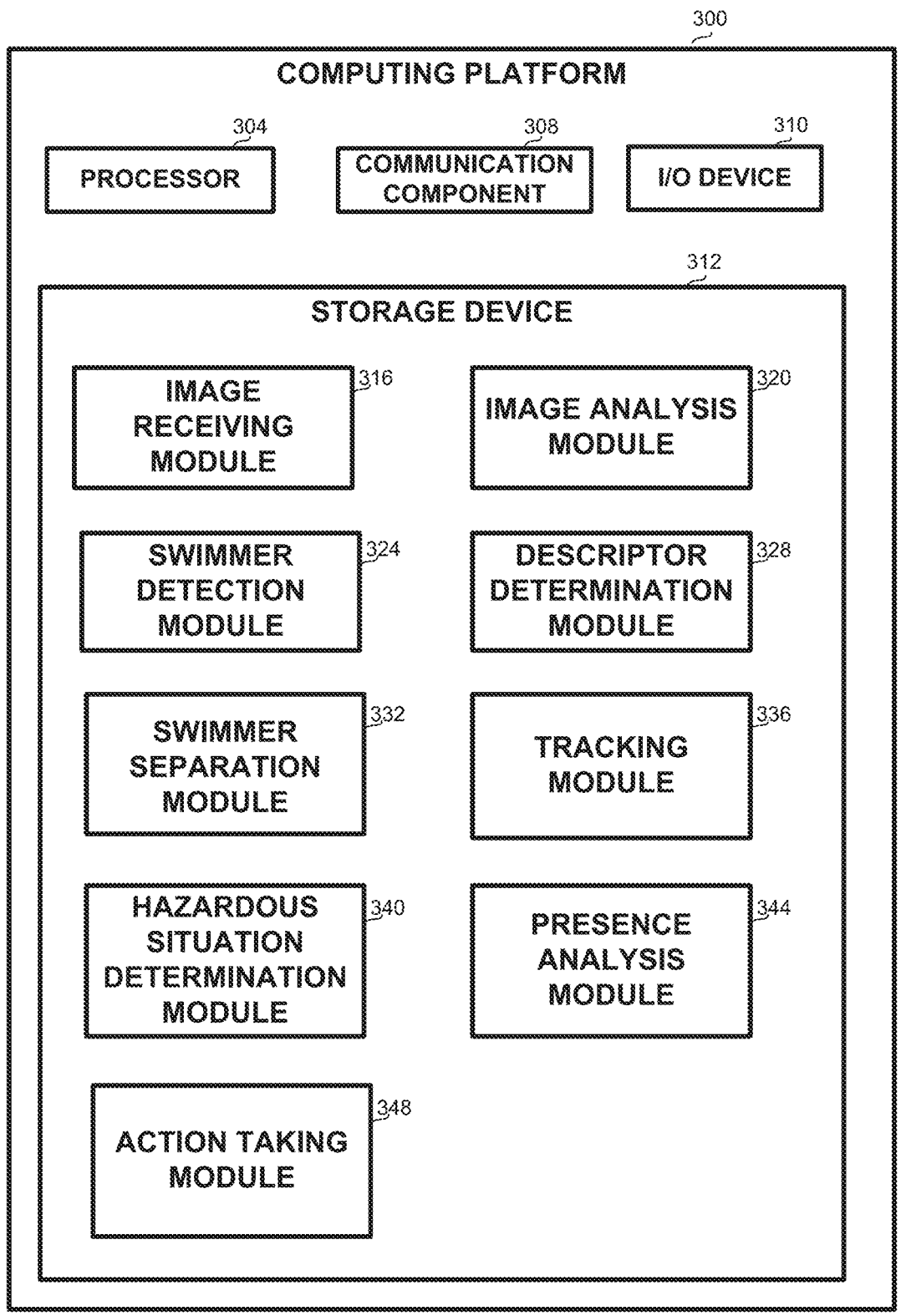
FIG. 3 shows a block diagram of a system for tracking swimmers and taking an action if required, in accordance with some exemplary embodiments of the disclosed subject matter.

An action may be taken on step 232 subject to such analysis, for example sending a report to an operator, taking steps for changing the presence in the pool, offering premonitions, or the like It will be appreciated that tracking may not always be successful in all images. For example, a swimmer may be identified in a sequence of images, then not identified in one or more further images, and then identified again in one or more images. As long as the number of consecutive images the person is not tracked in is below a threshold, or if the person was identified exiting the pool, tracking may continue without taking an action Referring now to FIG. 3, showing a block diagram of a system for tracking swimmers and alerting against hazardous situations in a pool monitored by one or more overhead cameras.

The system may comprise one or more Computing Platforms 300. In some embodiments, Computing Platform 300 may be a server, and provide services to one or more pools, each monitored by one or more cameras.

Computing Platform 300 may comprise a Processor 304 which may be one or more Central Processing Unit (CPU), a microprocessor, an electronic circuit, an Integrated Circuit (IC) or the like. Processor 304 may be configured to provide the required functionality, for example by loading to memory and activating the modules stored on Storage Device 312 detailed below.

It will be appreciated that Computing Platform 300 may be implemented as one or more computing platforms which may be in communication with one another. It will also be appreciated that Processor 304 may be implemented as one or more processors, whether located on the same platform or not.

Computing Platform 300 may comprise a Communication Component 308 for communicating with other systems or devices, for example receiving images from one or more cameras or other computing platforms or storage devices. Communication Component 308 may be adapted to communicate via any communication channel, such as a Wide Area Network, a Local Area Network, intranet, Internet or the like, and by any communication protocol.

Computing Platform 300 may also comprise Input/Output (I/O) Device 310 such as a display, a pointing device, a keyboard, a touch screen, a speakerphone, or the like. I/O Device 310 may be utilized to receive input from and provide output to a user, for example calibrate the system set off an alarm, output statistics, or the like.

Computing Platform 300 may comprise a Storage Device 312, such as a hard disk drive, a Flash disk, a Random Access Memory (RAM), a memory chip, or the like. In some exemplary embodiments, Storage Device 312 may retain program code operative to cause Processor 304 to perform acts associated with any of the modules listed below or steps of the method of FIG. 2 above. The program code may comprise one or more executable units, such as functions, libraries, standalone programs or the like, adapted to execute instructions as detailed below.

Storage Device 312 may comprise image Receiving Module 316, for receiving and optionally storing one or more images or parts thereof from a camera or a storage device, via. Communication Component 308. The images may be received in any required known or proprietary format.

Storage Device 312 may comprise Image Analysis Module 320, for operating one or more image processing algorithms on one or more images, such as foreground/background estimation, color histogram building or comparing, edge detection, contour detection, or the like.

Storage Device 312 may comprise Swimmer Detection Module 324, for detecting one or more swimmers within a captured image. Detection may use one or more algorithms provided by Image Analysis Module 520, including for example foreground/background estimation.

Storage Device 312 may comprise Descriptor Determination Module 328 for determining one or more descriptors for one or more swimmers, based on visual attributes of the swimmer as detected in one or more images. The descriptor can be a collection of one or more attributes, a clustering thereof, or the like. A swimmer may be associated with one or more descriptors, for example one or more descriptors describing what the swimmer looks like inside the water and one or more descriptors describing what the swimmer looks like outside the water.

Storage Device 312 may comprise Swimmer Separation Module 332, for separating two or more swimmers appearing adjacent or overlapping in one or more images. Separation may be performed in accordance with one or more descriptors determined by Descriptor Determination Module 328.

Storage Device 312 may comprise Tracking Module 336, for tracking a swimmer over a sequence of images. Tracking may operate continuously over a sequence of images, starting when the swimmer is outside the water, then enters the water and later exits the water, Wherein in one or more of the images the swimmer is separated from other swimmers as described above.

Storage Device 312 may comprise Hazardous Situations Determination Module 340, for determining hazardous situations, such as a swimmer not being detected for at least a predetermined period of time; a swimmer submerged in water for at least a predetermined period of time, possibly with short periods in which the swimmer is not submerged, or others.

Storage Device 312 may comprise Presence Analysis Module 344 for analyzing the presence of one or more swimmers in the pool or its environment, including for example statistical analysis of presence, number and frequency of visits, time spent in and out of the water, or the like.

Storage Device 312 may comprise Action Taking Module 348 for setting off an alert if a hazardous situation is detected by Hazardous Situations Determination Module 340. Raising the alert may include setting off an alarm; sounding an alarm; generating a visual or vibrating alert; and notifying a life guard or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing stale information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining a first multiplicity of images taken by at least two overhead cameras overlooking a body of water having a surface, wherein the at least two overhead cameras comprise at least a first camera and a second camera, each of which has a captured portion of the body of water, the first camera and the second camera have at least a partial overlap between their respective captured portions of the body of water;
   detecting a swimmer in at least some images from the first multiplicity of images, wherein the swimmer is outside the body of water or separated from other swimmers in the at least some images, wherein said detecting comprises differentiating between the swimmer and a background by applying at least one of: temporal averaging, Gaussian Mixture Model (GMM), Robust Principle Component Analysis (RPCA), subspace learning, and background subtraction, wherein said detecting the swimmer utilizes at least one object detection technique selected from: You Only Look Once (YOLO), Regional-based Convolutional Neural Networks (R-CNN), Fast R-CNN, and Faster R-CNN;
   determining a first descriptor and a second descriptor of the swimmer based on the at least some images from the first multiplicity of images, wherein the first and second descriptors comprise values of a set of attributes, wherein the first descriptor comprises a first set of values of the set of attributes describing a portion of the swimmer that is outside the body of water, wherein the second descriptor comprises a second set of values of the set of attributes describing a portion of the swimmer that is inside the body of water,
   wherein the first descriptor and the second descriptor are determined to uniquely identify the swimmer based on visual characteristics extracted from the at least some images, wherein the first descriptor and the second descriptor enable to separate the swimmer from other swimmers in images taken by the at least two overhead cameras, whereby enabling detection of the swimmer in the images using the first and second descriptors of the swimmer;
   obtaining a second multiplicity of images taken by the at least two overhead cameras;
   tracking the swimmer in the second multiplicity of images, wherein said tracking comprises detecting the swimmer using at least one of the first descriptor and the second descriptor, wherein said detecting the swimmer is performed with respect to at least one image from the second multiplicity of images in which the swimmer is at least partially occluded by other swimmers or is adjacent to other swimmers;
   identifying, based on said tracking, that the swimmer is in a hazardous situation; and
   subject to said identifying that the swimmer is in the hazardous situation, performing an action, wherein said performing the action comprises issuing an alert to a lifeguard.

2. The method of claim 1, wherein the second descriptor is determined based on the first descriptor.

3. The method of claim 1, wherein the second descriptor is determined based on the first descriptor and predetermined modifications resulting from the swimmer being in a water environment.

4. The method of claim 1, wherein said identifying that the swimmer is in the hazardous situation comprises:
   determining whether the swimmer is above or below the body of water in at least some of the second multiplicity of images.

5. The method of claim 1, wherein the action further comprises at least one of: setting off an alarm; sounding an alarm; and generating a visual alert or a vibrating alert.

6. The method of claim 1, further comprising:
   calculating statistics regarding a presence of the swimmer in the body of water and in its environment; and
   reporting the statistics to an operator.

7. The method of claim 1, further comprising:
analyzing a presence of the swimmer in the body of water and in its environment; and
taking a second action related to the presence of the swimmer.

8. The method of claim 1, wherein said tracking the swimmer in the second multiplicity of images comprises tracking the swimmer in an image in which a first part of the swimmer is separated from a second part of the swimmer by a part of another swimmer.

9. The method of claim 1, wherein the first camera has a viewing angle of at most 70° between a first line connecting the first camera and a projection of the first camera on a plane comprising the surface of the body of water, and a second line connecting the first camera and a point on the surface farthest from the first camera.

10. The method of claim 1, wherein the at least two overhead cameras capture an entire surface the body of water.

11. The method of claim 1, wherein said detecting the swimmer in the at least some images comprises differentiating between the background and a foreground of the at least some images.

12. The method of claim 1, wherein the first descriptor and the second descriptor are updated based on visual characteristics extracted from images in the second multiplicity of images.

13. The method of claim 1, wherein the visual characteristics extracted from the at least some images comprise at least one of: a color histogram indicative of colors that represent the swimmer; a gradient histogram; a contour edge between colors of the swimmer; a contour edge between shapes of the swimmer; a distinct feature of the swimmer; a unique pattern; a corner; an edge; a color co-occurrence matrix, and a texture.

14. The method of claim 1, wherein the second camera is positioned at a height above 1.80 meters from the surface of the body of water, the second camera is positioned in a height above a height of the lifeguard's eyes.

15. The method of claim 1, wherein the first multiplicity of images comprises a first image capturing a first portion of the swimmer and a second image capturing a second portion of the swimmer, wherein the first portion is different than the second portion; wherein the second multiplicity of images comprises a third image capturing the first portion of the swimmer and a fourth image capturing the second portion of the swimmer.

16. The method of claim 1, wherein the first multiplicity of images comprises a first image capturing the swimmer from a first angle and a second image capturing the swimmer from a second angle, wherein the first angle is different than the second angle; wherein the second multiplicity of images comprises a third image capturing the swimmer from the first angle and a fourth image capturing the swimmer from the second angle.

17. A system comprising:
a plurality of overhead cameras overlooking a body of water having a surface, wherein the plurality of overhead cameras comprises at least a first camera and a second camera, each of which has a captured portion of the body of water, the first camera and the second camera have at least a partial overlap between their respective captured portions of the body of water;
a computing platform that comprises a processor, the computing platform being configured to:
obtain a first multiplicity of images taken by the plurality of overhead cameras;
detect a swimmer in at least some images from the first multiplicity of images, wherein the swimmer is outside the body of water or separated from other swimmers in the at least some images, wherein said detect comprises differentiating between the swimmer and a background by applying at least one of: temporal averaging, Gaussian Mixture Model (GMM), Robust Principle Component Analysis (RPCA), subspace learning, and background subtraction, wherein said detect the swimmer utilizes at least one object detection technique selected from: You Only Look Once (YOLO), Regional-based Convolutional Neural Networks (R-CNN), Fast R-CNN, and Faster R-CNN;
determine a first descriptor and a second descriptor of the swimmer based on the at least some images from the first multiplicity of images, wherein the first and second descriptors comprise values of a set of attributes, wherein the first descriptor comprises a first set of values of the set of attributes describing a portion of the swimmer that is outside the body of water, wherein the second descriptor comprises a second set of values of the set of attributes describing a portion of the swimmer that is inside the body of water,
wherein the first descriptor and the second descriptor are determined to uniquely identify the swimmer based on visual characteristics extracted from the at least some images, wherein the first descriptor and the second descriptor enable to separate the swimmer from other swimmers in images taken by the plurality of overhead cameras, whereby enabling detection of the swimmer in the images using the first and second descriptors of the swimmer;
obtain a second multiplicity of images taken by the plurality of overhead cameras;
track the swimmer in the second multiplicity of images, wherein said tracking comprises detecting the swimmer using at least one of the first descriptor and the second descriptor, wherein said detecting the swimmer is performed with respect to at least one image from the second multiplicity of images in which the swimmer is at least partially occluded by other swimmers or is adjacent to other swimmers;
identify, based on said tracking, that the swimmer is in a hazardous situation; and
subject to said identifying that the swimmer is in the hazardous situation, perform an action, wherein said performing the action comprises issuing an alert to a lifeguard.

18. A computer program product comprising a non-transitory computer readable medium retaining program instructions, which instructions when read by a processor, cause the processor to perform:
obtaining a first multiplicity of images taken by at least two overhead cameras overlooking a body of water having a surface, wherein the at least two overhead cameras comprise at least a first camera and a second camera, each of which has a captured portion of the body of water, the first camera and the second camera have at least a partial overlap between their respective captured portions of the body of water;
detecting a swimmer in at least some images from the first multiplicity of images, wherein the swimmer is outside the body of water or separated from other swimmers in the at least some images, wherein said detecting comprises differentiating between the swimmer and a background by applying at least one of: temporal averaging, Gaussian Mixture Model (GMM), Robust Principle Component Analysis (RPCA), subspace learning, and background subtraction, wherein said detecting the swimmer utilizes at least one object detection technique selected from: You Only Look Once (YOLO), Regional-based Convolutional Neural Networks (R-CNN), Fast R-CNN, and Faster R-CNN;

determining a first descriptor and a second descriptor of the swimmer based on the at least some images from the first multiplicity of images, wherein the first and second descriptors comprise values of a set of attributes, wherein the first descriptor comprises a first set of values of the set of attributes describing a portion of the swimmer that is outside the body of water, wherein the second descriptor comprises a second set of values of the set of attributes describing a portion of the swimmer that is inside the body of water, wherein the first descriptor and the second descriptor are determined to uniquely identify the swimmer based on visual characteristics extracted from the at least some images, wherein the first descriptor and the second descriptor enable to separate the swimmer from other swimmers in images taken by the at least two overhead cameras, whereby enabling detection of the swimmer in the images using the first and second descriptors of the swimmer;

obtaining a second multiplicity of images taken by the at least two overhead cameras; and tracking the swimmer in the second multiplicity of images, wherein said tracking comprises detecting the swimmer using at least one of the first descriptor and the second descriptor, wherein said detecting the swimmer is performed with respect to at least one image from the second multiplicity of images in which the swimmer is at least partially occluded by other swimmers or is adjacent to other swimmers;

identifying, based on said tracking, that the swimmer is in a hazardous situation; and subject to said identifying that the swimmer is in the hazardous situation, performing an action, wherein said performing the action comprises issuing an alert to a lifeguard.

\* \* \* \* \*